United States Patent
Crombez et al.

(10) Patent No.: US 6,309,031 B1
(45) Date of Patent: Oct. 30, 2001

(54) VEHICLE BRAKE SYSTEM WITH VARIABLE BRAKE PEDAL FEEL

(75) Inventors: Dale Scott Crombez, Livonia; Dave James Lotito, Lathrup Village; Mark Alan Shehan, Ypsilanti; Steven Otis Pate, Royal Oak, all of MI (US)

(73) Assignee: Ford Global Technology, Inc., Dearborn, MI (US)

( * ) Notice: Subject to any disclaimer, the term of this patent is extended or adjusted under 35 U.S.C. 154(b) by 0 days.

(21) Appl. No.: 09/460,546

(22) Filed: Dec. 14, 1999

(51) Int. Cl.[7] ....................................................... B60T 8/34
(52) U.S. Cl. ............................................................ 303/113.4
(58) Field of Search ............................. 303/113.4, 155, 303/191; 180/272, 273, 287; 188/1.11 E

(56) References Cited

U.S. PATENT DOCUMENTS

| | | | |
|---|---|---|---|
| 3,643,525 | 2/1972 | Gibas | 74/512 |
| 4,655,505 | * 4/1987 | Kashiwamura et al. | 297/284 |
| 4,655,511 | 4/1987 | Leiber | 303/92 |
| 4,776,643 | 10/1988 | Leiber | 303/92 |
| 4,818,036 | * 4/1989 | Reinecke | 303/50 |
| 5,172,785 | 12/1992 | Takahashi | 180/141 |
| 5,378,052 | 1/1995 | Yoshino | 303/3 |
| 5,408,899 | 4/1995 | Stewart | 74/513 |
| 5,460,061 | 10/1995 | Redding et al. | 74/512 |
| 5,513,107 | * 4/1996 | Gormley | 364/424.05 |
| 5,555,495 | * 9/1996 | Bell et al. | 364/148 |
| 5,697,260 | 12/1997 | Rixon | 74/514 |
| 5,771,752 | 6/1998 | Cicotte | 74/512 |
| 5,816,667 | 10/1998 | Jokic | 303/113.4 |
| 5,819,593 | 10/1998 | Rixon et al. | 74/514 |
| 6,007,160 | * 12/1999 | Lubbers et al. | 303/114.1 |
| 6,012,007 | * 1/2000 | Fortune et al. | 701/45 |
| 6,078,854 | * 6/2000 | Breed et al. | 701/49 |
| 6,099,030 | * 8/2000 | Kraft | 280/735 |
| 6,099,086 | * 8/2000 | Feigel et al. | 303/113.4 |
| 6,104,296 | * 8/2000 | Yasushi et al. | 340/576 |
| 6,129,168 | * 10/2000 | Lotito et al. | 180/273 |
| 6,134,492 | * 10/2000 | Breed et al. | 701/49 |

* cited by examiner

Primary Examiner—Christopher P. Schwartz
Assistant Examiner—Xuan Lan Nguyen
(74) Attorney, Agent, or Firm—Gregory P. Brown; William J. Coughlin

(57) ABSTRACT

A vehicle brake system 10 has a brake pedal assembly 14, a sensor 18 or 22 for sensing effort applied to the brake pedal assembly and a brake actuator 26 for generating braking force to be applied to one or more brakes 12A–12D on the vehicle. The brake system further includes a position sensor for sensing a position signal, such as an adjustable brake pedal position sensor 40, a seat position sensor 42, a steering wheel position sensor 44, or a driver position sensor 46, which is generally indicative of the stature and/or comfort of the driver. The brake system further includes a controller 24 for automatically controlling the amount of braking force applied to the one or more brakes in the vehicle as a function of the sensed position. Accordingly, the brake system automatically adjusts the braking effort based on a sensed position signal.

14 Claims, 3 Drawing Sheets

VEHICLE BRAKE SYSTEM WITH VARIABLE BRAKE PEDAL FEEL

FIELD OF THE INVENTION

The present invention generally relates to vehicle braking and, more particularly, to a variable brake system that adjusts to conform to the needs of the vehicle operator.

BACKGROUND OF THE INVENTION

Conventional vehicle braking systems employ a brake pedal assembly having a brake pedal coupled to a master cylinder. The brake pedal is actuated by the vehicle operator to control the amount of braking torque applied to the wheels of the vehicle via friction braking with the use of hydraulic pressure or electromechanical force. In a brake-by-wire braking system, where the operator's braking request is generally independent of the brake torque, certain characteristics of the brake pedal are sensed and processed in accordance with a predetermined operating curve. For example, brake systems commonly employ either a stroke position sensor to sense the travel displacement of the brake pedal or a pressure sensor to sense the amount of pressure in the brake master cylinder, while some brake systems employ both sensors. An electronic brake controller processes the sensed information, computes the braking torque requested, and generates a control signal to control the amount of torque applied to the brakes of the vehicle. In conventional brake systems, the brake feel characteristics, which may include pedal force versus pedal travel, deceleration versus work, stiffness versus work, deceleration versus pedal force, and deceleration versus pedal travel, are typically permanently defined.

The aforementioned conventional brake system characteristics are generally fixed and therefore cannot be adjusted to accommodate various needs of different drivers. Instead, the position of other accessories in the vehicle, such as the driver's seat, the steering wheel, and the brake and accelerator pedal assembly, may be adjusted to allow the driver to select a preferred position that accommodates the driver's stature and comfort. Despite adjustments of the aforementioned vehicle accessories, the brake pedal must still be actuated with the same amount of effort and pedal travel to achieve the same braking effect. The brake system therefore does not fulfill all the needs for certain vehicle operators. For example, operators who are generally shorter in height may prefer a shortened brake pedal travel to compensate for their lower pedal force and pedal travel to achieve a certain braking torque or deceleration, while taller operators typically prefer an extended brake pedal travel and force to achieve the same braking torque or deceleration.

One approach for adjusting the braking effort in a vehicle is set forth in U.S. Pat. No. 5,378,052, which discloses an electronic brake pedal adjustment apparatus for setting certain braking characteristics by providing the driver with a manual input in the form of a slide control input device, so that the driver of the vehicle can manually adjust the desired braking characteristics. The apparatus of the aforementioned issued patent requires a separate manual input device that requires the driver of the vehicle to first determine the need for a change in braking effort, and then to physically adjust the input device to achieve the desired braking characteristic. Accordingly, the driver may have to manually readjust the manual input, particularly when different drivers having different anatomical dimensions use the same vehicle. In addition, the driver generally may not be accustomed to adjusting the input to the most advantageous position.

Accordingly, there is a need for a variable brake system in a vehicle that adjusts the braking effort to accommodate the needs of the driver.

SUMMARY OF THE INVENTION

In accordance with the teachings of the present invention, a vehicle brake system is provided which offers automatic variable brake effort control. The brake system includes a brake pedal assembly, a brake pedal sensor for sensing effort applied to the brake pedal assembly and generating a signal indicative thereof, and a brake actuator for generating braking force to be applied to one or more brakes on the vehicle. The brake system further includes a position sensor for sensing position of an object in the vehicle, such as a seat position sensor, a steering wheel position sensor, or an adjustable brake pedal position sensor, and generating a position signal which is generally indicative of the stature or comfort of the driver. The brake system further includes an electronic controller for receiving the sensor inputs and automatically controlling the amount of braking force applied to the one or more brakes on the vehicle as a function of the sensed brake pedal signal and the sensed position signal. Accordingly, the brake system of the present invention automatically adjusts the braking effort based on the sensed position signal.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
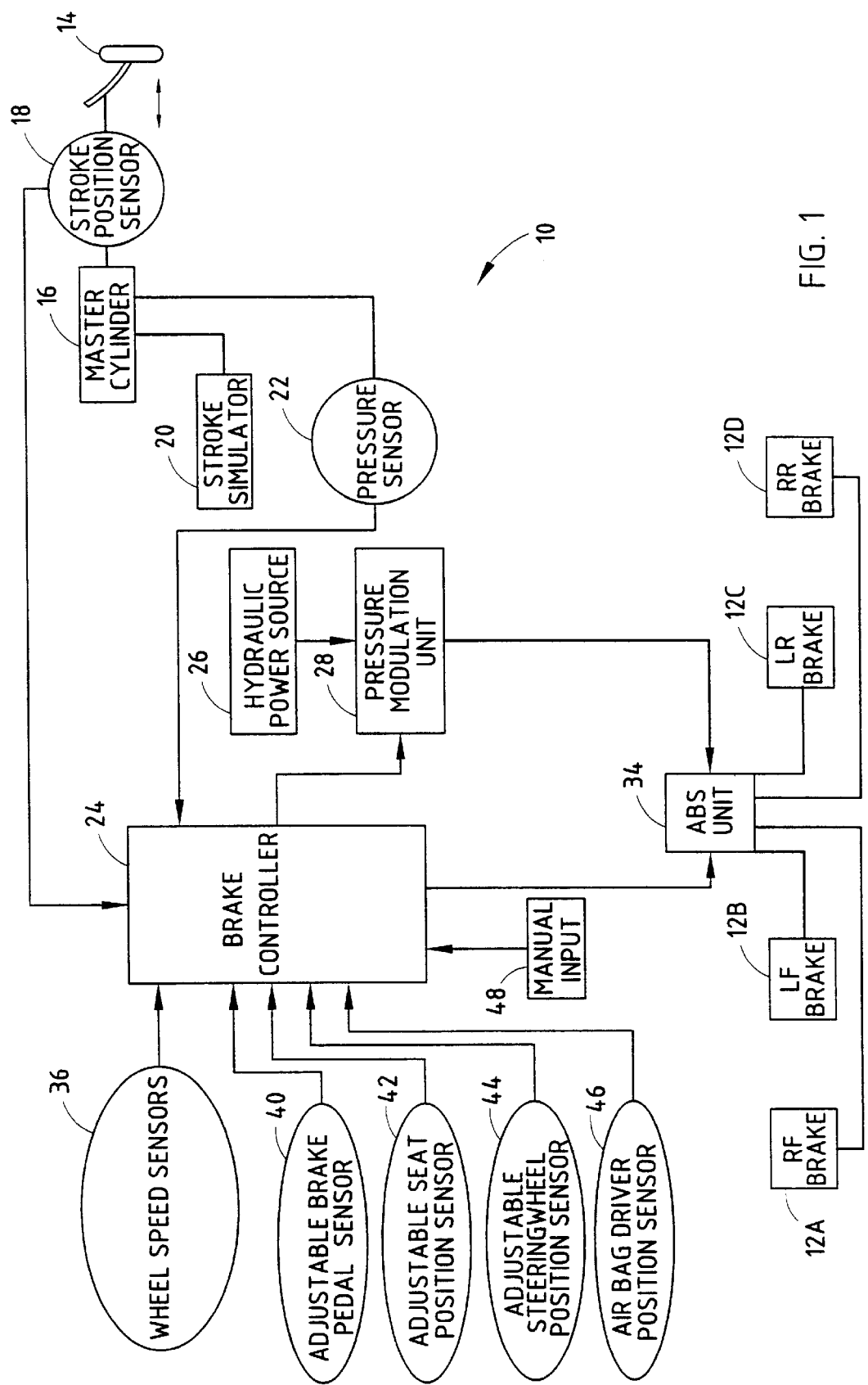
FIG. 1 is a block diagram illustrating a brake-by-wire brake system for an automotive vehicle according to the present invention.

Referring to FIG. 1, an electronic brake-by-wire brake system 10 is shown therein according to the present invention for use in braking a vehicle, such as an automobile. The brake system 10 is configured to automatically adjust braking effort, and therefore adjust vehicle deceleration rates, in response to sensed position inputs from adjustable mechanical devices such as an adjustable seat, an adjustable brake pedal assembly, and an adjustable steering column, all of which are generally related to the stature and/or comfort of the driver of the vehicle. The brake system 10 automatically adjusts the braking effort depending on one or more of the sensed position inputs without requiring a direct driver input.

The brake system 10 includes a brake pedal assembly having a brake pedal 14 that may be adjusted in position relative to the driver and is coupled to a master cylinder 16. When the brake pedal 14 is depressed by the driver of the vehicle, the master cylinder 16 is compressed and thereby increases in pressure. A pressure sensor 22 senses the pressure in the master cylinder 16. In addition, a stroke position sensor 18 senses the pedal stroke, i.e., travel distance of the brake pedal 14 or master cylinder 16. Further, a stroke simulator 20 is included to provide feedback feel to simulate the brake pedal feel. Stroke simulator 20 may include a hydraulic piston and/or spring bias. The sensed master cylinder pressure and pedal travel signals are employed as indications of the amount of braking effort requested by the driver.

The brake system 10 further includes an electronic brake controller 24 for controlling the braking operation, including automatically adjusting the braking characteristics in response to one or more sensed control inputs according to the present invention. The electronic brake controller 24 preferably includes a microprocessor and memory for storing and processing a brake control algorithm, and the hardware may include a commercially available controller. The electronic brake controller 24 receives the sensed signal output from stroke position sensor 18 and/or the sensed signal output from pressure sensor 22, and controls the braking torque as a function of one or both of these sensed signals.

The present brake system 10 is shown configured as a hydraulic actuated brake system having a hydraulic braking source 26 that provides a source of pressurized hydraulic fluid, and a pressure modulation unit 28 that controls the amount of pressurized hydraulic fluid applied to the brakes. Pressure modulation unit 28 has an input connected to the electronic brake controller 24 for receiving a brake control signal. The brake control signal indicates the amount of braking torque, that is requested by the brake pedal actuation as modified by the sensed control input(s). The pressure modulation unit 28 supplies a controlled amount of pressurized hydraulic fluid to an anti-lock brake system (ABS) unit 34 which in turn supplies pressurized brake fluid to each of the right front brake 12A, left front brake 12B, left rear brake 12C, and right rear brake 12D. Brakes 12A–12D provide friction braking to brake the wheels on the vehicles as is known in the art.

In addition to the brake pedal travel and pressure inputs, the electronic brake controller 24 receives sensed signal inputs from wheel speed sensors 36. The brake controller 24 also receives one or more brake pedal feel control inputs which are sensed position signals from adjustable vehicle mechanisms that are generally related to the stature and/or comfort of the driver. Included in the brake pedal feel control inputs is an adjustable brake pedal position sensor 40 for sensing the position of the adjustable brake pedal. Sensor 40 is able to detect the selected position of the brake pedal as an indication of the driver's stature and/or desired comfort. Another control input may include an adjustable seat position sensor for sensing the adjusted position of the driver's seat. The driver's seat position also serves as a good indication of the stature and/or comfort of the driver. Another control input includes an adjustable steering wheel position sensor 44 which senses the selected position of the steering wheel. Finally, an air bag driver position sensor 46 may also serve as a pedal feel control input to provide a signal indicative of the sensed position of the driver relative to the driver's side air bag. It should be appreciated that each of the sensors 40, 42, 44, and 46 provides a signal which is generally related to the driver's stature and/or comfort and serves to provide an indication of how to automatically modify the braking effort.

In addition to the sensed position signals, a manual input 48 may be employed to provide a signal to electronic brake controller 24 to allow the driver of the vehicle to further modify the braking characteristics. Manual input 48 may include a slide control, a rotary control, or other manual adjustment device, such as those disclosed in U.S. Pat. No. 5,378,052.

Figure 2:
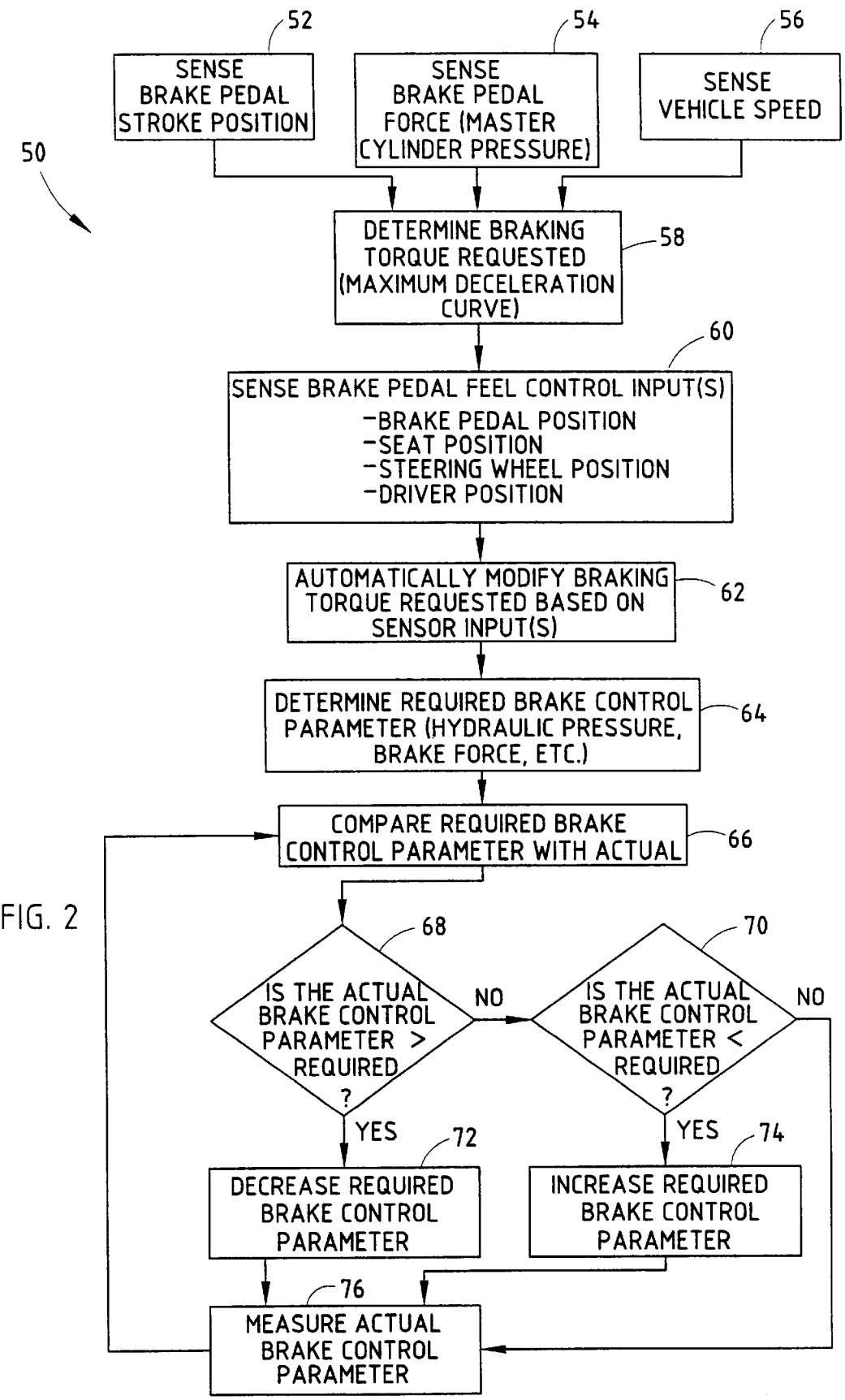
FIG. 2 is flow diagram illustrating a method of automatically adjusting brake pedal feel in the brake system according to the present invention.

The electronic brake controller 24 is programmed to perform the preferred brake control methodology 50 shown in FIG. 2. The brake control methodology 50 includes step 52 of sensing the brake pedal stroke position via sensor 18, step 54 of sensing the brake pedal force in the master cylinder pressure as sensed by the pressure sensor 22, and step 56 of sensing vehicle speed. Given each of the sensed signals for brake pedal stroke position, brake pedal force, and sensed vehicle speed, methodology 50 proceeds to step 58 to determine the braking torque requested by the driver's actuation of the brake pedal. The braking torque requested may be determined from a predetermined maximum deceleration curve stored in memory, which serves as the default curve. The deceleration curve may be a function of vehicle deceleration and brake pedal travel or the brake pedal force. Vehicle deceleration can be determined from the sensed wheel speed signals.

Next, methodology 50 proceeds to step 60 to sense one or more brake pedal feel control inputs. Sensed brake pedal feel control inputs may include any one or more of the brake pedal position, the driver's seat position, the steering wheel position, and the driver's position as sensed by the air bag sensor. Each of the sensed position signals serves to provide an indication of the driver's approximate stature and/or comfort, since the position signals are taken from adjustable mechanisms that the driver may adjust to fit the driver's stature and/or comfort needs. Given the sensed brake pedal feel control input(s), step 62 modifies the braking torque requested based on one or more of the sensed position inputs. The braking torque modification occurs automatically, without any direct initiation by the driver.

Given the modified braking torque requested, step 64 determines the required brake control parameter. In a hydraulic actuated brake system, the required brake control parameter is the pressurized hydraulic brake fluid applied to the brakes. The amount of hydraulic brake fluid pressure is generally controlled by controlling the pressure modulation unit. In an electromechanical actuated braking system, the required brake control parameter is the brake force to be applied to the brakes. The electromechanically actuated brake force is generally realized by controlling one or more motors. In addition to hydraulic and electromechanical braking, the present invention may also employ other friction braking actuators, such as pneumatic actuators, regenerative braking, engine or compression braking, or combinations of various braking actuators.

In step 66, brake control methodology 50 compares the required brake control parameter with the actual brake control parameter and, in step 68, decides if the actual brake control parameter is greater than the required brake control parameter. If the actual brake control parameter is greater than the required brake control parameter, methodology 50 proceeds to step 72 to decrease the required brake control parameter, and further proceeds to step 76 to measure the actual brake control parameter before returning to step 66. If the actual brake control parameter is not greater than the required brake control parameter in decision block 68, methodology 50 proceeds to decision block 70 to check if the actual brake control parameter is less than the required and, if not, proceeds to step 76 to measure the actual brake control parameter. If the actual brake control parameter is less than the required brake control parameter, methodology 50 increases the required brake control parameter in step 74, and then proceeds to step 76 to measure the actual brake control parameter. Following step 76, methodology 50 returns to step 66 to compare the required brake control parameter with the actual brake control parameter. It should be appreciated that the brake control methodology 50 may be repeated continuously, and may be performed only at selected times, such as when the vehicle is keyed-on or when the brake pedal is applied.

Figure 3:
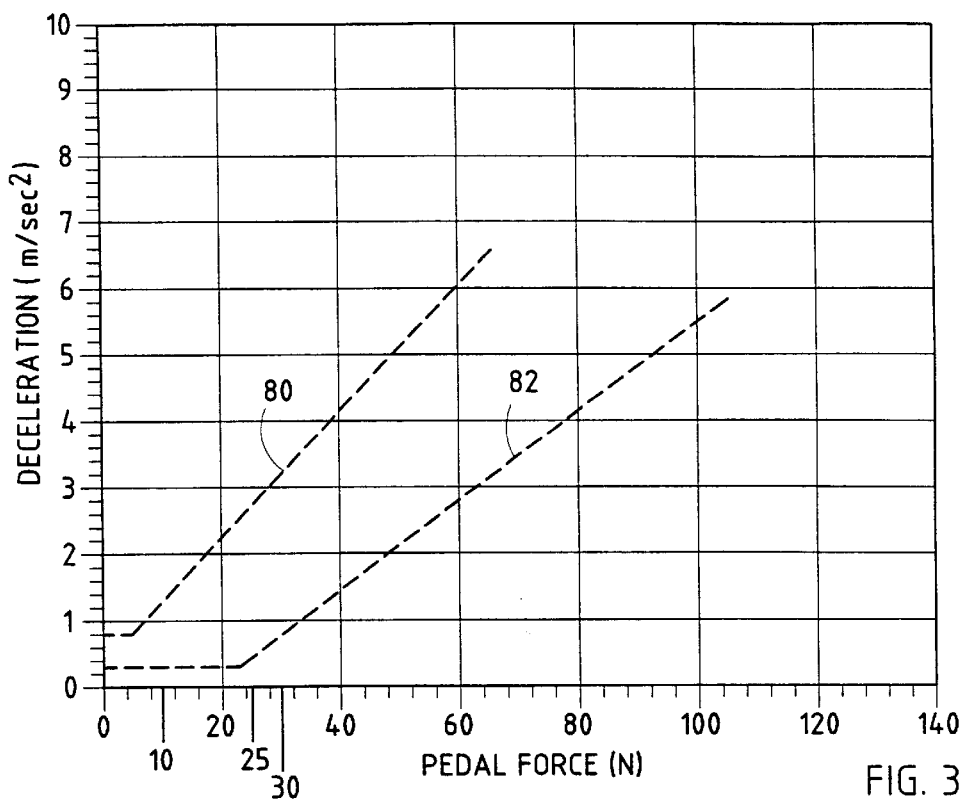
FIG. 3 is a graph illustrating two boost ratio curves plotted as a function of deceleration and pedal force that are selectable to control the brake pedal feel.
Figure 4:
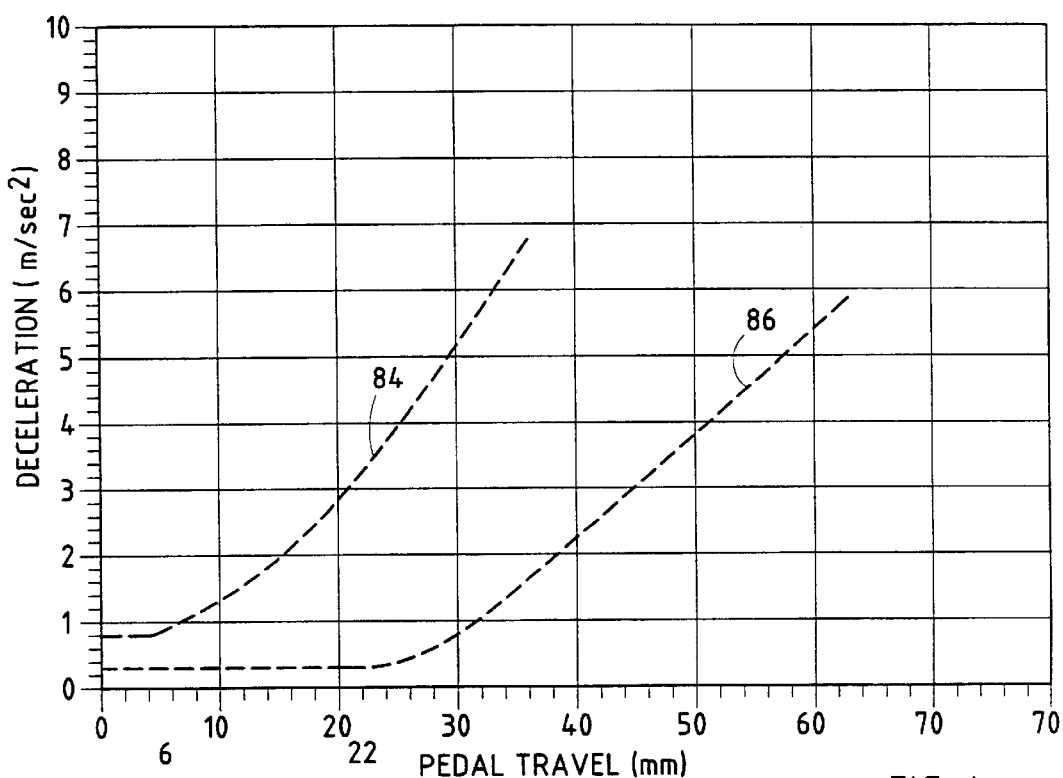
FIG. 4 is a graph illustrating two boost ratio curves plotted as a function of deceleration and pedal travel that are selectable to control brake pedal feel.

Referring to FIGS. 3 and 4, examples of brake boost ratio control curves are provided therein. With particular reference to FIG. 3, control curves 80 and 82 define the brake boost ratio as a function of vehicle deceleration (m/sec$^2$) versus pedal force (N). As one example, the amount of braking torque requested can be modified according to the present invention to switch from control curve 80 to control curve 82 or anywhere in between to change the amount of brake pedal effort that is required to provide a desired braking torque to achieve a certain vehicle deceleration. With particular reference to FIG. 4, another example is shown with two curves 84 and 86 plotted as a function of vehicle deceleration (m/sec$^2$) versus brake pedal travel (mm). According to this example, the amount of braking torque requested may be modified according to the present invention to change from control curve 84 to control curve 86 or anywhere in between to change the braking characteristics and therefore the amount of effort applied to the brake pedal to achieve a certain vehicle deceleration.

Accordingly, the brake system 10 of the present invention automatically controls the braking effort as a function of one or more sensed position signals, such as an adjustable brake pedal position signal, an adjustable seat position signal, an adjustable steering wheel position signal, or an air bag driver position signal, all of which are generally related to the stature and/or comfort of the driver. It should be appreciated that the brake system 10 of the present invention is particularly well-suited for use in a brake-by-wire brake system where the vehicle deceleration can be adjusted electronically, and may be employed in connection with a hydraulic actuated brake system, an electromechanical actuated braking system, or other types of brake actuators.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle braking system having variable braking control for automatically adjusting brake pedal feel to accommodate the stature of an operator of the vehicle, said system comprising:
    a brake pedal assembly;
    a brake pedal sensor for sensing effort applied to said brake pedal assembly and generating a signal indicative thereof;
    a brake actuator for generating braking force to be applied to one or more brakes on a vehicle;
    a position sensor for sensing a position characteristic of the vehicle operator which is generally indicative of stature of the vehicle operator and generating a position signal indicative thereof; and
    an electronic controller for receiving the sensed brake pedal effort signal and position signal and automatically controlling the amount of braking force applied to the one or more brakes by the actuator as a function of the sensed brake pedal effort signal and the sensed position signal.

2. The system as defined in claim 1, wherein said braking system comprises a brake-by-wire braking system.

3. The system as defined in claim 1, wherein said brake pedal sensor senses travel of the brake pedal assembly.

4. The system as defined in claim 1, wherein said brake pedal sensor comprises a pressure sensor for sensing an amount of pressure caused by actuation of the brake pedal assembly.

5. The system as defined in claim 1, wherein said position sensor comprises a brake pedal travel sensor for generating a signal indicative of the travel distance of an adjustable brake pedal.

6. The system as defined in claim 1, wherein said position sensor comprises a seat position sensor for sensing a signal indicative of the position of a vehicle seat.

7. The system as defined in claim 1, wherein said position sensor comprises a steering wheel sensor for generating a signal indicative of the position of the steering wheel.

8. The system as defined in claim 1, wherein said position sensor comprises an air bag sensor.

9. A method of automatically adjusting braking effort for a vehicle brake system, said method comprising the steps of:
    sensing an amount of effort applied to a brake pedal assembly and generating a signal indicative thereof;
    generating a signal representative of braking force requested by the sensed effort applied to the brake pedal assembly;
    sensing a position characteristic which is generally indicative of stature of the vehicle operator; and
    automatically controlling the amount of braking force applied to one or more brakes on a vehicle as a function of the sensed position characteristic and the signal indicative of the sensed amount of effort applied to the brake pedal assembly.

10. The method as defined in claim 9, wherein said step of sensing a position characteristic comprises sensing position of an accessory in the vehicle.

11. The method as defined in claim 10, wherein said step of sensing position of an accessory comprises sensing travel distance of an adjustable brake pedal.

12. The method as defined in claim 10, wherein said step of sensing position of an accessory comprises sensing position of a vehicle seat.

13. The method as defined in claim 11, wherein said step of sensing position of a vehicle accessory comprises sensing position of a vehicle steering wheel.

14. The method as defined in claim 9, wherein said step of sensing a position characteristic comprises sensing position of a driver of the vehicle with a vehicle air bag sensor.

* * * * *